United States Patent
Akhlaque-E-Rasul et al.

(10) Patent No.: US 9,950,594 B1
(45) Date of Patent: Apr. 24, 2018

(54) IMPACT ABSORBING SYSTEM FOR A VEHICLE

(71) Applicant: FORD GLOBAL TECHNOLOGIES, LLC, Dearborn, MI (US)

(72) Inventors: Shaikh Akhlaque-E-Rasul, Windsor (CA); Nitesh Chandrakant Jadhav, Canton, MI (US); William Moore Sherwood, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/454,637

(22) Filed: Mar. 9, 2017

(51) Int. Cl.
*B60J 5/04* (2006.01)

(52) U.S. Cl.
CPC .......... *B60J 5/0441* (2013.01); *B60J 5/045* (2013.01)

(58) Field of Classification Search
CPC ........ B60J 5/0441; B60J 5/0413; B60J 5/045; B60R 13/0243; B60R 2019/1866; B60R 2021/0041; B60R 2021/0058; B60R 2021/0006
USPC ............... 296/146.5–146.7, 187.05, 187.12
See application file for complete search history.

(56) References Cited

U.S. PATENT DOCUMENTS

| | | | | |
|---|---|---|---|---|
| 5,306,066 A * | 4/1994 | Saathoff | ............... | B60J 5/0451 188/377 |
| 5,820,191 A * | 10/1998 | Blakewood, Jr. | ...... | B60J 5/0413 296/146.7 |
| 6,604,779 B1 * | 8/2003 | Cheng | ................ | B60J 5/0441 296/187.12 |
| 6,862,846 B1 * | 3/2005 | Kirejczyk | ............. | B60J 5/0416 296/146.7 |
| 7,744,983 B2 * | 6/2010 | Ota | ................... | B29C 45/14336 296/146.7 |
| 8,172,305 B2 * | 5/2012 | Schmelz | ............... | B60J 5/0416 296/146.7 |
| 2005/0260385 A1 * | 11/2005 | Cowelchuk | .............. | B32B 7/02 428/138 |
| 2006/0261633 A1 * | 11/2006 | Winborn | ............ | B60R 13/0206 296/146.7 |
| 2006/0265961 A1 * | 11/2006 | Winborn | ............... | B60J 5/0418 49/502 |
| 2007/0222257 A1 * | 9/2007 | Flendrig | ............... | B60J 5/0405 296/146.6 |
| 2009/0256391 A1 * | 10/2009 | Hall | ..................... | B60J 5/0451 296/187.12 |
| 2015/0266260 A1 * | 9/2015 | Fujioka | ................... | B32B 3/30 428/118 |
| 2017/0225720 A1 * | 8/2017 | Sanders | ................. | B21C 37/00 |

FOREIGN PATENT DOCUMENTS

| | | | | |
|---|---|---|---|---|
| DE | 19736100 A1 | 2/1998 | | |
| EP | 1129877 A1 | 9/2001 | | |
| EP | 1674313 A2 | 6/2006 | | |
| EP | 2818347 | * 12/2014 | ............. | B60J 5/045 |

* cited by examiner

*Primary Examiner* — Gregory A Blankenship
(74) *Attorney, Agent, or Firm* — Jason Rogers; Brooks Kushman P.C.

(57) ABSTRACT

A vehicle includes a door and an impact absorbing structure. The door has an interior panel. The impact absorbing structure is secured to an inner surface of the interior panel. The impact absorbing structure has a centrally located hub and a plurality of spokes extending radially outward from the hub toward a peripheral boundary of the interior panel.

18 Claims, 2 Drawing Sheets

IMPACT ABSORBING SYSTEM FOR A VEHICLE

TECHNICAL FIELD

The present disclosure relates to vehicles and more particularly to vehicle body structures.

BACKGROUND

Vehicle body structures may include specific structural components designed to minimize intrusion of portions of the vehicle or foreign objects into the vehicle cabin during impact events.

SUMMARY

A vehicle includes a door and an impact absorbing structure. The door has an interior panel. The impact absorbing structure is secured to an inner surface of the interior panel. The impact absorbing structure has a centrally located hub and a plurality of spokes extending radially outward from the hub toward a peripheral boundary of the interior panel.

A vehicle door includes an external panel, internal panel, and an impact absorbing structure. The external and internal panels define a cavity therebetween. The impact absorbing structure is disposed within the cavity and is secured to an inner surface of the internal panel. The impact absorbing structure has a spider web configuration that includes a plurality of spokes extending radially outward from a central hub toward a peripheral boundary of the internal panel.

A vehicle body panel includes a metallic sheet and an impact absorbing web. The impact absorbing web is secured to an inner surface of the metallic sheet. The impact absorbing web has a first set of wires extending radially outward from a centrally located hub toward a peripheral boundary of the metallic sheet. The impact absorbing web also has a second set of wires extending circumferentially around the hub, each secured to the first set of wires along intersections between the first and second sets of wires.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
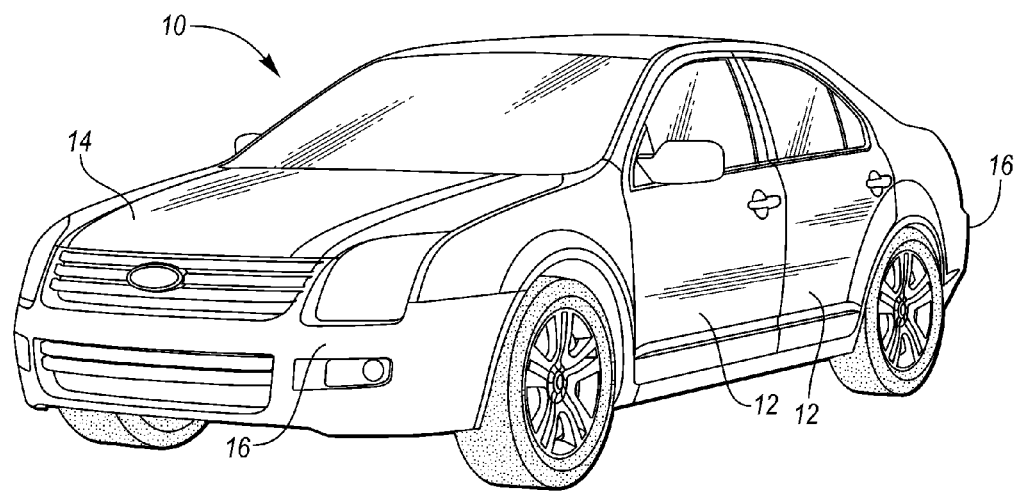
FIG. 1 is a perspective view of a vehicle.

Referring to FIG. 1, a vehicle 10 is illustrated. The vehicle 10 includes a body or frame that supports the components the comprise that vehicle 10, such as the engine, transmission, drive shafts, other powertrain components, suspension system components, steering system components, cabin interior components (e.g., dashboard or seats), trunk lid, doors 12, engine compartment hood 14, bumpers 16, various external body panels (e.g., roof panel, floor panel, or fenders), etc. The body or frame structure may be referred to as the vehicle's body-in-white structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The vehicle's body-in-white structure may be said to support or include the various external body panels such as the roof panel, floor panel, or fenders.

Figure 2:
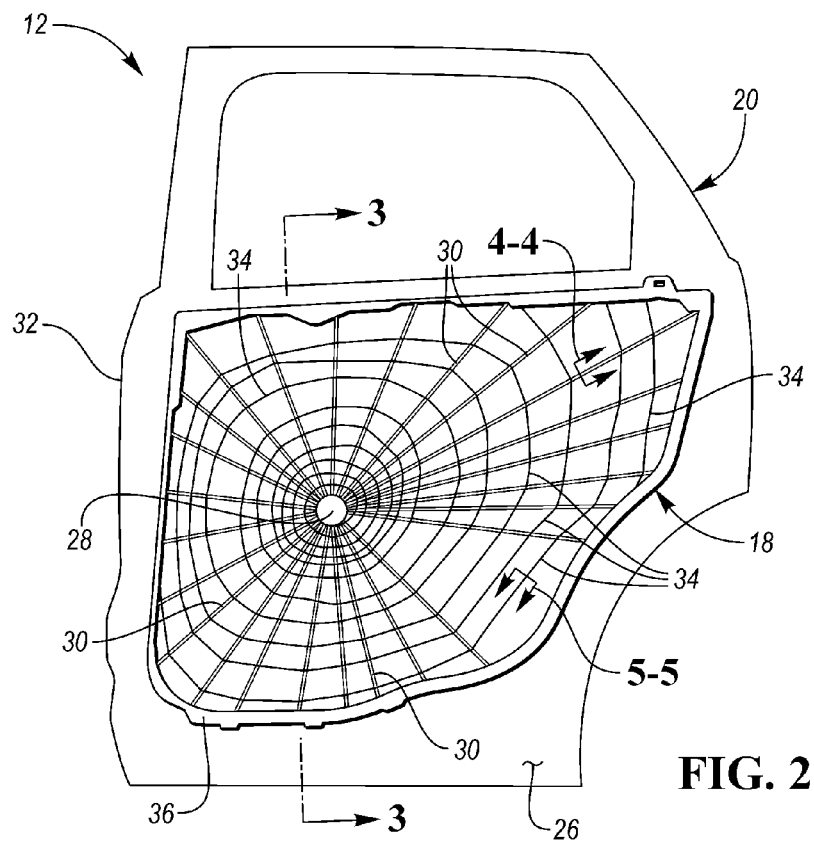
FIG. 2 is a vehicle door that includes a first embodiment of an impact absorbing structure.
Figure 3:
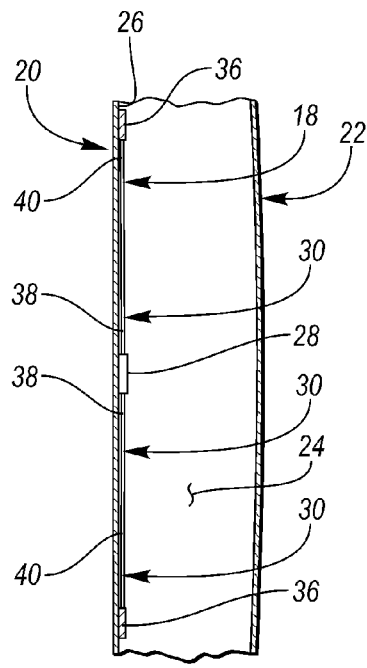
FIG. 3 is a cross-sectional view taken along line 3-3 in FIG. 2.

Referring to FIGS. 2 and 3, the vehicle door 12 including a first embodiment of an impact absorbing structure 18 is illustrated. The door 12 includes an interior (or internal) panel 20 and an exterior (or external) panel 22. The interior door panel 20 may also be referred to as the door inner panel. The exterior panel 22 is not shown in FIG. 2 for illustrative purposes. The interior panel 20 and exterior panel 22 may each be made from a metallic sheet material, such as steel, aluminum, magnesium, or any alloy thereof. The interior panel 20 and exterior panel 22 may define a cavity 24 therebetween. The impact absorbing structure 18 may be disposed within the cavity 24 and secured to an inner (or internal) surface 26 of the interior panel 20. Although the impact absorbing structure 18 is shown to be secured to a panel that is a component of a vehicle door, it should be understood that the impact absorbing structure 18 may also be secured to any other body panel or sheet component of a vehicle.

The impact absorbing structure 18 includes a centrally located hub 28 and a first set of wires 30 that extend radially outward from the centrally located hub 28 toward a peripheral boundary 32 of the interior panel 20. The first set of wires 30 may also be referred to as a plurality of spokes or structural wires that extend radially outward from the centrally located hub 28 toward the peripheral boundary 32 of the interior panel 20. The first set of wires 30 may extend from the centrally located hub 28 in incremental positions that span 360 degrees. The angles between each incremental position (i.e., the angles between a pair of adjacent wires that are included in the first set of wires 30) may range from 5 degrees to 120 degrees, for example. The impact absorbing structure 18 may also include a second set of wires 34, which may also be referred to as structural wires, that extend circumferentially around the centrally located hub 28. Each of the second set of wires 34 may be secured to the first set of wires 30 at locations where the second set of wires 34 intersect or overlap the first set of wires 30. The combination of the first set of wires 30 and the second set of wires 34 gives the impact absorbing structure 18 a spider web like configuration. Since the impact absorbing structure 18 has a spider web like configuration, the impact absorbing structure 18 may also be referred to as an impact absorbing web.

The second set of wires 34 may refer to one or more wires that form a spiral shaped configuration that extends radially outward from the centrally located hub 28. This spiral shaped configuration of the second set of wires 34 forms a plurality of loops around the centrally located hub 28. The spiral shaped configured of the second set of wires 34 increases in diameter extending radially outward from the centrally located hub 28. It may also be stated that the plurality of loops increases in diameter extending radially outward from the centrally located hub 28.

The impact absorbing structure 18 also includes an outer frame 36 that is secured to the inner surface 26 of the interior panel 20 proximate to the peripheral boundary 32 of the interior panel 20. Proximate to the peripheral boundary 32 may refer to directly adjacent to the peripheral boundary 32 or within a limited distance from the peripheral boundary 32. For example, the outer frame 36 may be located anywhere from zero to eight inches from the peripheral boundary 32. The outer frame 36 may be secured to the inner surface of the interior panel 20 by a welding process or by fasteners, such as rivets, screws, bolts, etc. The first set of wires 30 may include first ends 38 that are secured to the centrally located hub of 28 and second ends 40 that are secured to the outer frame 36.

The first set of wires 30 may be secured the outer frame 36 by a welding process or by fasteners, such as rivets, screws, bolts, etc. The second set of wires 34 may be secured to the first set of wires 30 by a welding process (with or without looping one set of wires around the other set of wires). At positions where the second set of wires 34 is secured to the outer frame 36, if any, the second set of wires 34 may be secured to the outer frame 36 by a welding process or by fasteners, such as rivets, screws, bolts, etc. It should also be noted that, in addition to the outer frame 36, the centrally located hub 28 and/or the first set of wires 30 may be directly secured to the inner surface 26 of the interior panel 20.

The components of the impact absorbing structure 18, including the first set of wires 30, second set of wires 34, and the outer frame 36 may be made from any structural material that is capable of absorbing energy during an impact such as steel, aluminum, magnesium, titanium, or any alloys thereof. The components of the impact absorbing structure 18 may alternatively be made from composite materials such as fiber-reinforced plastics. The first set of wires 30 may be configured to absorb the majority of energy during an impact event while the second set of wires 34 may be configured to transfer energy between the first set of wires 30. Therefore, the first set of wires 30 may be made from a stiff material (i.e., hardened steel) while the second set of wires 34 may be made from a soft or flexible material (e.g., soft or non-hardened steel).

Figure 4:
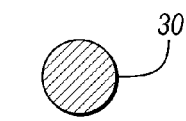
FIG. 4 is a cross-sectional view taken along line 4-4 in FIG. 2.
Figure 5:
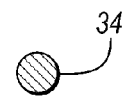
FIG. 5 is a cross-sectional view taken along line 5-5 in FIG. 2.

Referring to FIGS. 4 and 5, cross-sectional views of the first set of wires 30 and the second set of wires 34 are illustrated, respectively. The scale in FIGS. 4 and 5 is larger relative to FIGS. 2 and 3 for illustrative purposes. FIGS. 4 and 5 illustrate that the cross-sectional areas of the first set of wires 30 may be greater than the cross-section areas of the second set of wires 34, since the first set of wires 30 may be configured to absorb the majority of energy during an impact event while the second set of wires 34 may be configured to transfer energy between the first set of wires 30, as described above. Although the cross-sectional areas are shown to be circular in shape, it should be understood that the cross-sectional areas of either the first set of wires 30 or the second set of wires 34 may have a noncircular shape. For example, the cross-sectional areas of the first set of wires 30 and/or the second set of wires 34 may be rectangular, square, trapezoidal, hexagonal, or octagonal in shape.

Figure 6:
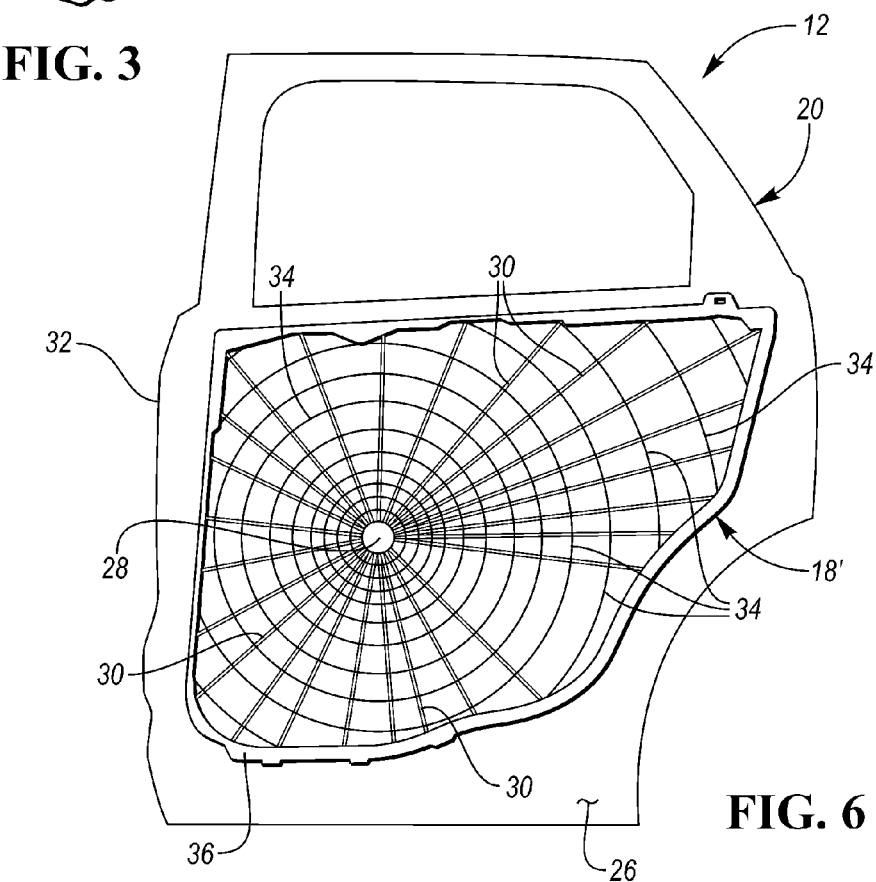
FIG. 6 is a vehicle door that includes a second embodiment of the impact absorbing structure.

Referring to FIG. 6, the vehicle door 12 including a second embodiment of an impact absorbing structure 18' is illustrated. The components of the impact absorbing structure 18' should be construed to have the same properties and functions as the corresponding components of the impact absorbing structure 18, unless described herein. The second set of wires 34 of the impact absorbing structure 18' form closed loops around the centrally located hub 28. The closed loops increase in diameter extending radially outward from the centrally located hub 28.

The impact absorbing structures 18 and 18' allow the load of an impact to be distributed to the periphery of the door. Transferring the load to the periphery of the door may reduce the change in position of the top of the door that results from an impact. Reducing the change in position of the top of the door that results from an impact may in turn may reduce any door latching issues (i.e., the inability to open the door) and the amount door intrusion into the vehicle cabin caused by the impact.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a door having an interior panel; and
   an impact absorbing structure secured to an inner surface of the interior panel and having,
   a centrally located hub,
   a plurality of spokes extending radially outward from the hub toward a peripheral boundary of the interior panel, and
   a spiral shaped wire extending radially outward from the hub, wherein the spiral shaped wire forms a plurality of loops around the hub, increases in diameter extending radially outward from the hub, and is secured to the plurality of spokes along intersections between plurality of spokes and the loops.

2. The vehicle of claim 1, wherein cross-sectional areas of the plurality of spokes are greater than a cross-sectional area of the spiral shaped wire.

3. The vehicle of claim 1, wherein the impact absorbing structure includes a plurality of structural wires that form closed loops around the hub, wherein the closed loops increase in diameter extending radially outward from the hub and the structural wires are secured to the plurality of spokes along intersections between plurality of spokes and the loops.

4. The vehicle of claim 3, wherein cross-sectional areas of the plurality of spokes are greater than cross-sectional areas of the plurality of structural wires.

5. The vehicle of claim 1, wherein the impact absorbing structure includes an outer frame that is secured to the inner surface of the interior panel proximate to the peripheral boundary, and wherein the spokes have first ends that are secured to the hub and second ends that are secured to the outer frame.

6. The vehicle of claim 1, wherein the spokes extend from the hub in incremental positions that span 360 degrees.

7. The vehicle of claim 6, wherein an angle between each incremental position ranges between 5 and 60 degrees.

8. A vehicle door comprising:
external and internal panels defining a cavity therebetween; and
an impact absorbing structure disposed within the cavity and secured to an inner surface of the internal panel, the impact absorbing structure having a spider web configuration that includes,
a plurality of spokes extending radially outward from a central hub toward a peripheral boundary of the internal panel, and
a spiral shaped wire extending radially outward from the hub, wherein the spiral shaped wire forms a plurality of loops around the hub, increases in diameter extending radially outward from the hub, and is secured to the plurality of spokes along intersections between plurality of spokes and the loops.

9. The door of claim 8, wherein cross-sectional areas of the plurality of spokes are greater than a cross-sectional area of the spiral shaped wire.

10. The door of claim 8, wherein the impact absorbing structure includes a plurality of structural wires that form closed loops around the hub, and wherein the closed loops increase in diameter extending radially outward from the hub and the structural wires are secured to the plurality of spokes along intersections between plurality of spokes and the loops.

11. The door of claim 10, wherein cross-sectional areas of the plurality of spokes are greater than cross-sectional areas of the plurality of structural wires.

12. The door of claim 8, wherein the impact absorbing structure includes an outer frame that is secured to the inner surface of the internal panel proximate to the peripheral boundary, and wherein the spokes have first ends that are secured to the hub and second ends that are secured to the outer frame.

13. A vehicle body panel comprising:
a metallic sheet; and
an impact absorbing web secured to an inner surface of the metallic sheet and having,
a first set of wires extending radially outward from a centrally located hub toward a peripheral boundary of the metallic sheet, and
a second set of wires extending circumferentially around the hub, each secured to the first set of wires along intersection between the first and second sets of wires.

14. The panel of claim 13, wherein the second set of wires extend radially outward from the hub in a spiral shaped configuration, and wherein second set of wires forms a plurality of loops around the hub that increase in diameter extending radially outward from the hub.

15. The panel of claim 14, wherein cross-sectional areas of the first set of wires are greater than cross-sectional areas of the second set of wires.

16. The panel of claim 13, wherein the second set of wires form closed loops around the hub, and wherein the closed loops increase in diameter extending radially outward from the hub.

17. The panel of claim 16, wherein cross-sectional areas of the first set of wires are greater than cross-sectional areas of the second set of wires.

18. The panel of claim 13, wherein the impact absorbing web includes an outer frame that is secured to the inner surface of the metallic sheet proximate to the peripheral boundary, and wherein the first set of wires have first ends that are secured to the hub and second ends that are secured to the outer frame.

* * * * *